(12) United States Patent
Milliken

(10) Patent No.: US 7,328,349 B2
(45) Date of Patent: *Feb. 5, 2008

(54) HASH-BASED SYSTEMS AND METHODS FOR DETECTING, PREVENTING, AND TRACING NETWORK WORMS AND VIRUSES

(75) Inventor: Walter Clark Milliken, Dover, NH (US)

(73) Assignee: BBN Technologies Corp., Cambridge, MA (US)

( * ) Notice: Subject to any disclaimer, the term of this patent is extended or adjusted under 35 U.S.C. 154(b) by 766 days.

This patent is subject to a terminal disclaimer.

(21) Appl. No.: 10/251,403

(22) Filed: Sep. 20, 2002

(65) Prior Publication Data

US 2003/0115485 A1 Jun. 19, 2003

Related U.S. Application Data

(60) Provisional application No. 60/341,462, filed on Dec. 14, 2001.

(51) Int. Cl.
| | |
|---|---|
| *H04L 9/00* | (2006.01) |
| *G06F 11/00* | (2006.01) |
| *G06F 12/14* | (2006.01) |
| *G06F 12/16* | (2006.01) |
| *G06F 15/18* | (2006.01) |
| *G06B 23/00* | (2006.01) |
| *H04L 12/26* | (2006.01) |
| *H04L 12/16* | (2006.01) |

(52) U.S. Cl. ............... 713/181; 713/178; 713/179; 713/180; 713/160; 713/161; 726/22; 726/23; 726/24; 726/25; 370/229; 370/230; 370/231; 370/232

(58) Field of Classification Search ........ 713/178–181, 713/160–161; 726/22–25; 370/229–235
See application file for complete search history.

(56) References Cited

U.S. PATENT DOCUMENTS 5,761,531 A 6/1998 Ohmura et al.
(Continued)

FOREIGN PATENT DOCUMENTS

WO WO 00/28420 5/2000

OTHER PUBLICATIONS

U.S. Appl. No. 09/881,145, filed Jun. 14, 2001.
(Continued)

*Primary Examiner*—Christopher Revak
*Assistant Examiner*—Longbit Chai
(74) *Attorney, Agent, or Firm*—Ropes & Gray LLP

(57) ABSTRACT

A system (126-129) detects transmission of potentially malicious packets. The system (126-129) receives packets and generates hash values corresponding to each of the packets. The system (126-129) may then compare the generated hash values to hash values corresponding to prior packets. The system (126-129) determines that one of the packets is a potentially malicious packet when the generated hash value corresponding to the one packet matches one of the hash values corresponding to one of the prior packets and the one prior packet was received within a predetermined amount of time of the one packet. The system (126-129) may also facilitate the tracing of the path taken by a potentially malicious packet. In this case, the system (126-129) may receive a message that identifies a potentially malicious packet, generate hash values from the potentially malicious packet, and determine whether one or more of the generated hash values match hash values corresponding to previously-received packets. The system (126-129) may then identify the potentially malicious packet as one of the previously-received packets when one or more of the generated hash values match the hash value corresponding to the one previously-received packet.

29 Claims, 8 Drawing Sheets

320

| HASH ADDRESS (416) | INDICATOR FIELD (412) | COUNTER (414) | LINK ID (422) | STATUS (424) |
|---|---|---|---|---|
| HASH ADDRESS | INDICATOR FIELD | COUNTER | LINK ID | STATUS |
| HASH ADDRESS | INDICATOR FIELD | COUNTER | LINK ID | STATUS |
| HASH ADDRESS | INDICATOR FIELD | COUNTER | LINK ID | STATUS |
| HASH ADDRESS | INDICATOR FIELD | COUNTER | LINK ID | STATUS |
| ⋮ | | | | |
| HASH ADDRESS | INDICATOR FIELD | COUNTER | LINK ID | STATUS |

U.S. PATENT DOCUMENTS

| | | | |
|---|---|---|---|
| 5,765,030 | A | 6/1998 | Nachenberg et al. |
| 5,959,976 | A | 9/1999 | Kuo |
| 6,038,233 | A | 3/2000 | Hamamoto et al. |
| 6,138,254 | A | 10/2000 | Voshell |
| 6,223,172 | B1 | 4/2001 | Hunter et al. |
| 6,266,337 | B1 | 7/2001 | Marco |
| 6,279,113 | B1 * | 8/2001 | Vaidya ............... 726/23 |
| 6,389,419 | B1 | 5/2002 | Wong et al. |
| 6,397,259 | B1 | 5/2002 | Lincke et al. |
| 6,424,650 | B1 | 7/2002 | Yang et al. |
| 6,430,184 | B1 | 8/2002 | Robins et al. |
| 6,438,612 | B1 | 8/2002 | Ylonen et al. |
| 6,519,264 | B1 | 2/2003 | Carr et al. |
| 6,662,230 | B1 | 12/2003 | Eichstaedt et al. |
| 6,707,915 | B1 | 3/2004 | Jobst et al. |
| 6,782,503 | B1 | 8/2004 | Dawson |
| 6,804,237 | B1 | 10/2004 | Luo et al. |
| 6,842,861 | B1 | 1/2005 | Cox et al. |
| 6,870,849 | B1 | 3/2005 | Callon et al. |
| 6,909,205 | B2 | 6/2005 | Corcoran et al. |
| 6,947,442 | B1 | 9/2005 | Sato et al. |
| 6,978,223 | B2 | 12/2005 | Milliken |
| 2002/0001384 | A1 * | 1/2002 | Buer et al. ............. 380/30 |
| 2002/0071438 | A1 * | 6/2002 | Singh ............. 370/398 |
| 2003/0061502 | A1 | 3/2003 | Teblyashkin et al. |
| 2003/0097439 | A1 | 5/2003 | Strayer et al. |
| 2003/0110393 | A1 * | 6/2003 | Brock et al. ............. 713/200 |
| 2005/0014749 | A1 | 1/2005 | Chen et al. |
| 2005/0058129 | A1 | 3/2005 | Jones et al. |

OTHER PUBLICATIONS

U.S. Appl. No. 09/881,074, filed Jun. 14, 2001.

Stefan Savage, David Wetherall, Anna Karlin and Tom Anderson, Practical Network Support for IP Traceback, Proc. ACM Sigcomm 2000, Stockholm, Sweden, Aug. 2000, 12 pages.

Beverly Schwartz, Alden W. Jackson, W. Timothy Strayer, Wenyi Zhou, R. Dennis Rockwell and Craig Partridge, Smart Packets: Applying Active Networks to Network Management, ACM Trans. On Computer Systems, vol. 18, No. 1, Feb. 2000, pp. 67-88.

Todd Herberlein; "Worm Detection and Prevention: Concept, Approach, and Experience"; Net Squared, Inc.; http://www.attackcenter.com/Information/WhitePapers/WormDetect/; Aug. 14, 2002; pp. 1-7.

S. Staniford-Chen, and L. Todd Herberlein; "Holding Intruders Accountable on the Internet"; Proceedings of the 1995 IEEE Symposium on Security and Privacy; Oakland, CA, pp. 39-49, May 8-10, 1995.

* cited by examiner

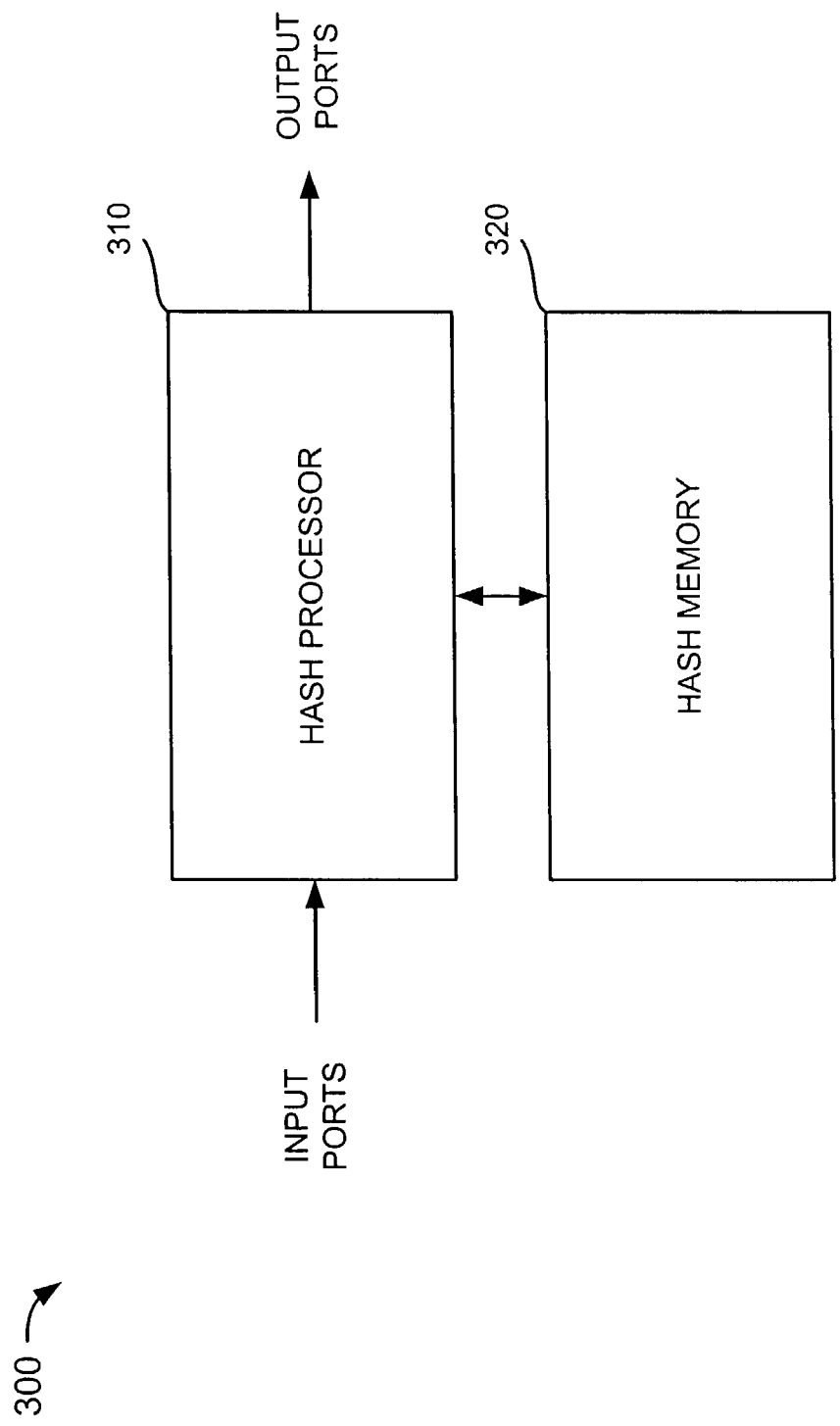

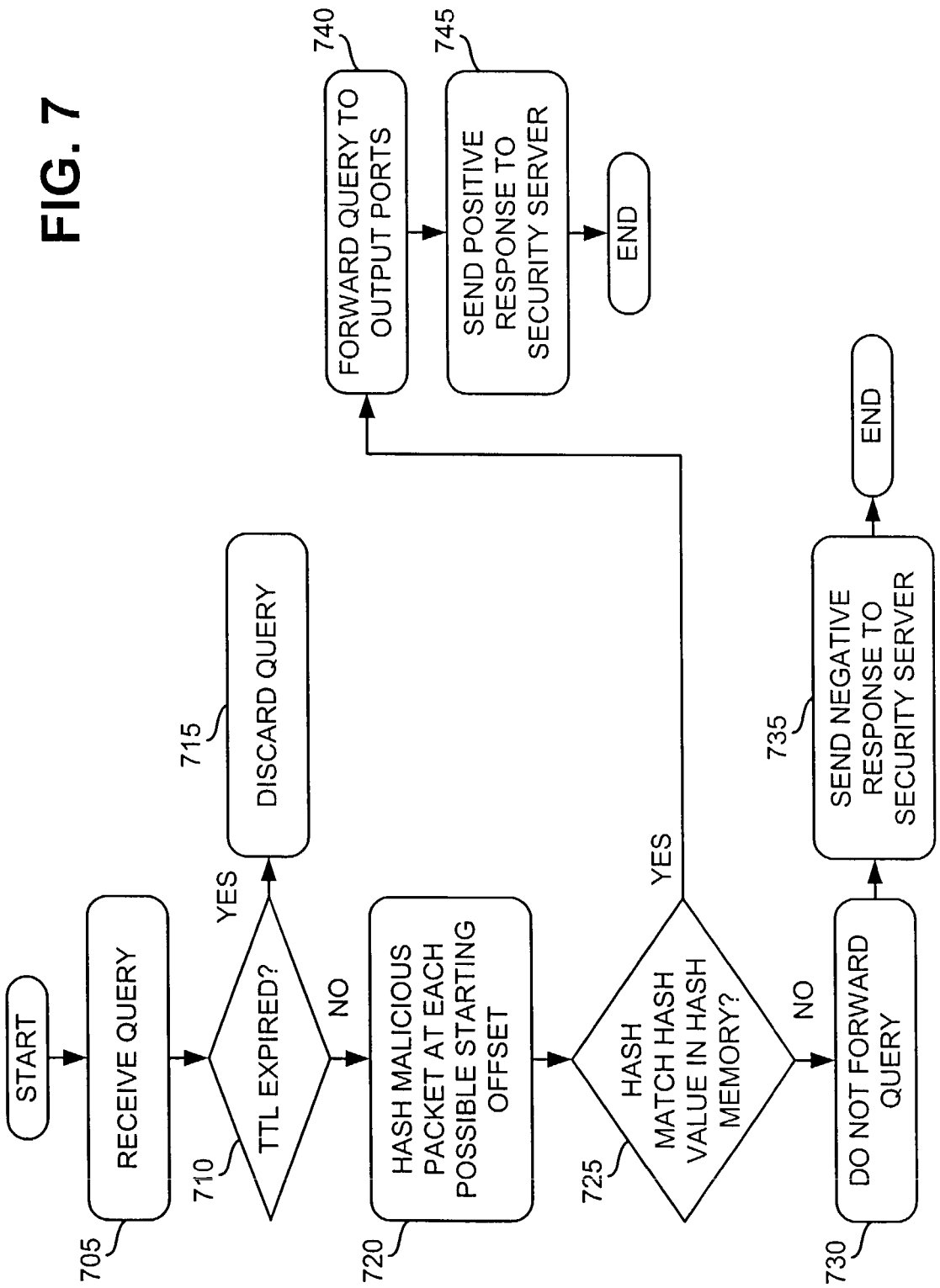

HASH-BASED SYSTEMS AND METHODS FOR DETECTING, PREVENTING, AND TRACING NETWORK WORMS AND VIRUSES

RELATED APPLICATION

This application claims priority under 35 U.S.C. § 119 based on U.S. Provisional Application No. 60/341,462, filed Dec. 14, 2001, the disclosure of which is incorporated herein by reference. This application is related to U.S. patent application, Ser. No. 09/881,145, and U.S. patent application, Ser. No. 09/881,074, both of which were filed on Jun. 14, 2001, and both of which are incorporated herein by reference.

BACKGROUND OF THE INVENTION

1. Field of the Invention

The present invention relates generally to network security and, more particularly, to systems and methods for detecting and/or preventing the transmission of malicious packets, such as worms and viruses, and tracing their paths through a network.

2. Description of Related Art

Availability of low cost computers, high speed networking products, and readily available network connections has helped fuel the proliferation of the Internet. This proliferation has caused the Internet to become an essential tool for both the business community and private individuals. Dependence on the Internet arises, in part, because the Internet makes it possible for multitudes of users to access vast amounts of information and perform remote transactions expeditiously and efficiently. Along with the rapid growth of the Internet have come problems caused by malicious individuals or pranksters launching attacks from within the network. As the size of the Internet continues to grow, so does the threat posed by these individuals.

The ever-increasing number of computers, routers, and connections making up the Internet increases the number of vulnerability points from which these malicious individuals can launch attacks. These attacks can be focused on the Internet as a whole or on specific devices, such as hosts or computers, connected to the network. In fact, each router, switch, or computer connected to the Internet may be a potential entry point from which a malicious individual can launch an attack while remaining largely undetected. Attacks carried out on the Internet often consist of malicious packets being injected into the network. Malicious packets can be injected directly into the network by a computer, or a device attached to the network, such as a router or switch, can be compromised and configured to place malicious packets onto the network.

One particularly troublesome type of attack is a self-replicating network-transferred computer program, such as a virus or worm, that is designed to annoy network users, deny network service by overloading the network, or damage target computers (e.g., by deleting files). A virus is a program that infects a computer or device by attaching itself to another program and propagating itself when that program is executed, possibly destroying files or wiping out memory devices. A worm, on the other hand, is a program that can make copies of itself and spread itself through connected systems, using up resources in affected computers or causing other damage.

In recent years, viruses and worms have caused major network performance degradations and wasted millions of man-hours in clean-up operations in corporations and homes all over the world. Famous examples include the "Melissa" e-mail virus and the "Code Red" worm.

Various defenses, such as e-mail filters, anti-virus programs, and firewall mechanisms, have been employed against viruses and worms, but with limited success. The defenses often rely on computer-based recognition of known viruses and worms or block a specific instance of a propagation mechanism (i.e., block e-mail transfers of Visual Basic Script (.vbs) attachments). New viruses and worms have appeared, however, that evade existing defenses.

Accordingly, there is a need for new defenses to thwart the attack of known and yet-to-be-developed viruses and worms. There is also a need to trace the path taken by a virus or worm.

SUMMARY OF THE INVENTION

Systems and methods consistent with the present invention address these and other needs by providing a new defense that attacks malicious packets, such as viruses and worms, at their most common denominator (i.e., the need to transfer a copy of their code over a network to multiple target systems, where this code is generally the same for each copy, even though the rest of the message containing the virus or worm may vary). The systems and methods also provide the ability to trace the path of propagation back to the point of origin of the malicious packet (i.e., the place at which it was initially injected into the network).

In accordance with the principles of the invention as embodied and broadly described herein, a system detects the transmission of potentially malicious packets. The system receives packets and generates hash values corresponding to each of the packets. The system may then compare the generated hash values to hash values corresponding to prior packets. The system may determine that one of the packets is a potentially malicious packet when the generated hash value corresponding to the one packet matches one of the hash values corresponding to one of the prior packets and the one prior packet was received within a predetermined amount of time of the one packet.

According to another implementation consistent with the present invention, a system for hampering transmission of a potentially malicious packet is disclosed. The system includes means for receiving a packet; means for generating one or more hash values from the packet; means for comparing the generated one or more hash values to hash values corresponding to prior packets; means for determining that the packet is a potentially malicious packet when the generated one or more hash values match one or more of the hash values corresponding to at least one of the prior packets and the at least one of the prior packets was received within a predetermined amount of time of the packet; and means for hampering transmission of the packet when the packet is determined to be a potentially malicious packet.

According to yet another implementation consistent with the present invention, a method for detecting a path taken by a potentially malicious packet is disclosed. The method includes storing hash values corresponding to received packets; receiving a message identifying a potentially malicious packet; generating hash values from the potentially malicious packet; comparing the generated hash values to the stored hash values; and determining that the potentially malicious packet was one of the received packets when one or more of the generated hash values match the stored hash values.

BRIEF DESCRIPTION OF THE DRAWINGS

The accompanying drawings, which are incorporated in and constitute a part of this specification, illustrate the invention and, together with the description, explain the invention. In the drawings.

FIG. 3 is an exemplary diagram of packet detection logic according to an implementation consistent with the principles of the invention;

FIG. 7 is a flowchart of exemplary processing for determining whether a malicious packet, such as a virus or worm, has been observed according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide mechanisms to detect and/or prevent the transmission of malicious packets and trace the propagation of the malicious packets through a network. Malicious packets, as used herein, may include viruses, worms, and other types of data with duplicated content, such as illegal mass e-mail (e.g., spam), that are repeatedly transmitted through a network.

According to implementations consistent with the present invention, the content of a packet may be hashed to trace the packet through a network. In other implementations, the header of a packet may be hashed. In yet other implementations, some combination of the content and the header of a packet may be hashed.

EXEMPLARY SYSTEM CONFIGURATION

Figure 1:
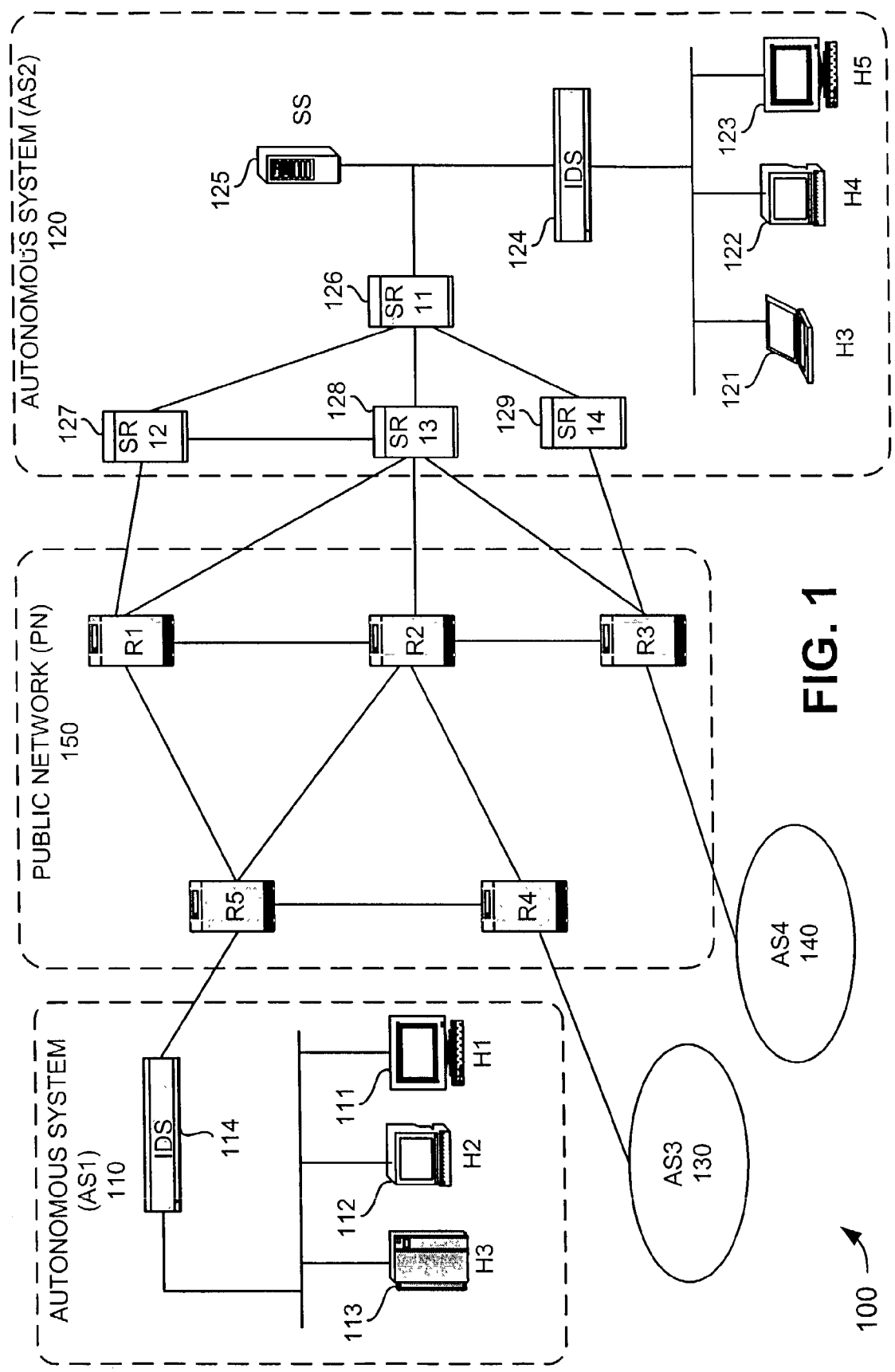
FIG. 1 is a diagram of a system in which systems and methods consistent with the present invention may be implemented.

FIG. 1 is a diagram of an exemplary system 100 in which systems and methods consistent with the present invention may be implemented. System 100 includes autonomous systems (ASs) 110-140 connected to public network (PN) 150. Connections made in system 100 may be via wired, wireless, and/or optical communication paths. While FIG. 1 shows four autonomous systems connected to a single public network, there can be more or fewer systems and networks in other implementations consistent with the principles of the invention.

Public network 150 may include a collection of network devices, such as routers (R1-R5) or switches, that transfer data between autonomous systems, such as autonomous systems 110-140. In an implementation consistent with the present invention, public network 150 takes the form of the Internet, an intranet, a public telephone network, a wide area network (WAN), or the like.

An autonomous system is a network domain in which all network devices (e.g., routers) in the domain can exchange routing tables. Often, an autonomous system can take the form of a local area network (LAN), a WAN, a metropolitan area network (MAN), etc. An autonomous system may include computers or other types of communication devices (referred to as "hosts") that connect to public network 150 via an intruder detection system (IDS), a firewall, one or more border routers, or a combination of these devices.

Autonomous system 110, for example, includes hosts (H) 111-113 connected in a LAN configuration. Hosts 111-113 connect to public network 150 via an intruder detection system 114. Intruder detection system 114 may include a commercially-available device that uses rule-based algorithms to determine if a given pattern of network traffic is abnormal. The general premise used by an intruder detection system is that malicious network traffic will have a different pattern from normal, or legitimate, network traffic.

Using a rule set, intruder detection system 114 monitors inbound traffic to autonomous system 110. When a suspicious pattern or event is detected, intruder detection system 114 may take remedial action, or it can instruct a border router or firewall to modify operation to address the malicious traffic pattern. For example, remedial actions may include disabling the link carrying the malicious traffic, discarding packets coming from a particular source address, or discarding packets addressed to a particular destination.

Autonomous system 120 contains different devices from autonomous system 110. These devices aid autonomous system 120 in identifying and/or preventing the transmission of potentially malicious packets within autonomous system 120 and tracing the propagation of the potentially malicious packets through autonomous system 120 and, possibly, public network 150. While FIG. 1 shows only autonomous system 120 as containing these devices, other autonomous systems, including autonomous system 110, may include them.

Autonomous system 120 includes hosts (H) 121-123, intruder detection system 124, and security server (SS) 125 connected to public network 150 via a collection of devices, such as security routers (SR11-SR14) 126-129. Hosts 121-123 may include computers or other types of communication devices connected, for example, in a LAN configuration. Intruder detection system 124 may be configured similar to intruder detection system 114.

Security server 125 may include a device, such as a general-purpose computer or a server, that performs source path identification when a malicious packet is detected by intruder detection system 124 or a security router 126-129. While security server 125 and intruder detection system 124 are shown as separate devices in FIG. 1, they can be combined into a single unit performing both intrusion detection and source path identification in other implementations consistent with the present invention.

Figure 2:
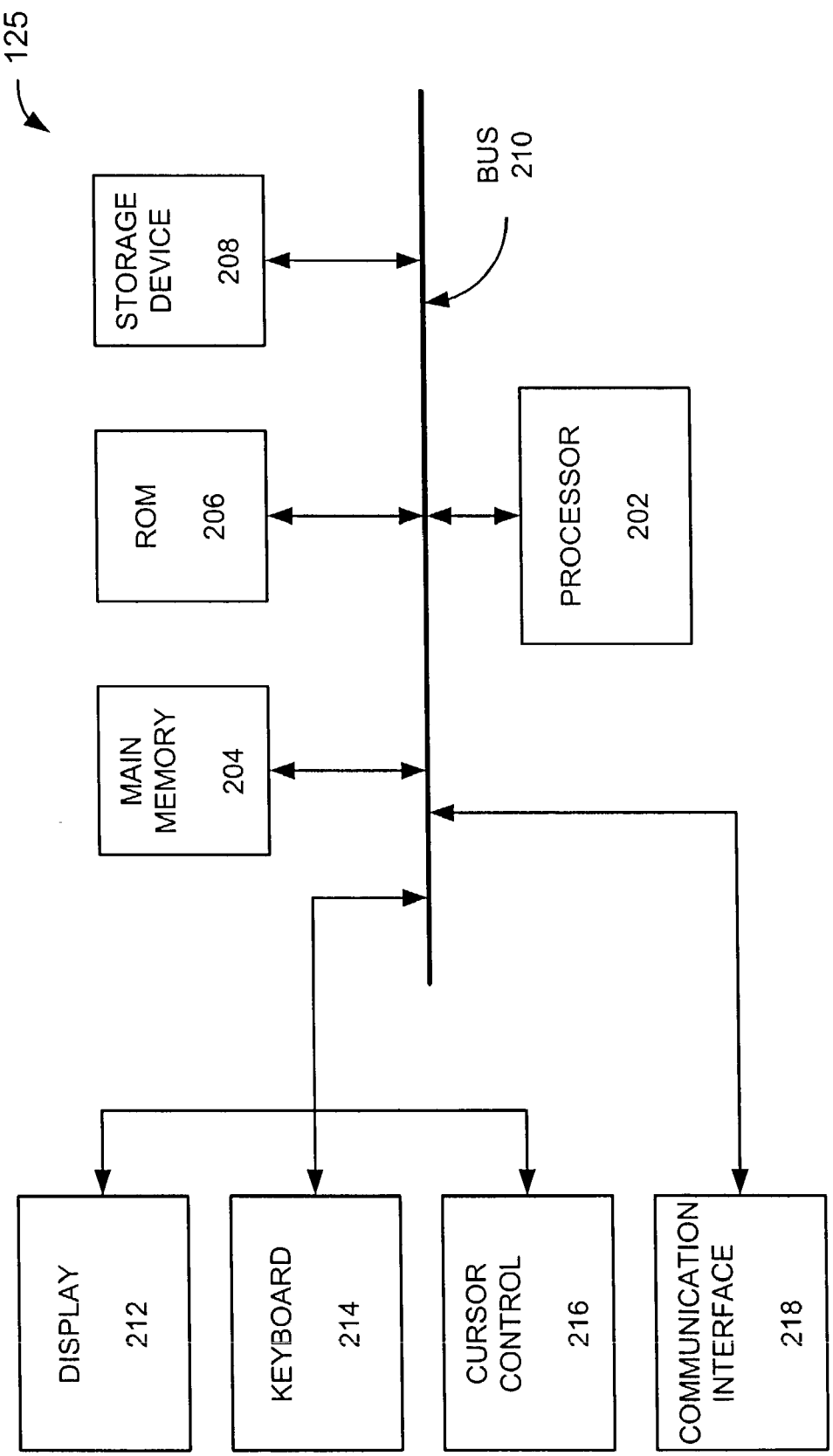
FIG. 2 is an exemplary diagram of a security server of FIG. 1 according to an implementation consistent with the principles of the invention.

FIG. 2 is an exemplary diagram of security sever 125 according to an implementation consistent with the principles of the invention. While one possible configuration of security server 125 is illustrated in FIG. 2, other configurations are possible.

Security server 125 may include a processor 202, main memory 204, read only memory (ROM) 206, storage device 208, bus 210, display 212, keyboard 214, cursor control 216, and communication interface 218. Processor 202 may include any type of conventional processing device that interprets and executes instructions.

Main memory 204 may include a random access memory (RAM) or a similar type of dynamic storage device. Main memory 204 may store information and instructions to be executed by processor 202. Main memory 204 may also be used for storing temporary variables or other intermediate information during execution of instructions by processor 202. ROM 206 may store static information and instructions for use by processor 202. It will be appreciated that ROM 206 may be replaced with some other type of static storage device. Storage device 208, also referred to as a data storage device, may include any type of magnetic or optical media and their corresponding interfaces and operational hardware. Storage device 208 nay store information and instructions for use by processor 202.

Bus 210 may include a set of hardware lines (conductors, optical fibers, or the like) that allow for data transfer among the components of security server 125. Display device 212 may be a cathode ray tube (CRT), liquid crystal display (LCD) or the like, for displaying information in an operator or machine-readable form. Keyboard 214 and cursor control 216 may allow the operator to interact with security server 125. Cursor control 216 may include, for example, a mouse. In an alternative configuration, keyboard 214 and cursor control 216 can be replaced with a microphone and voice recognition mechanisms to enable an operator or machine to interact with security server 125.

Communication interface 218 enables security server 125 to communicate with other devices/systems via any communications medium. For example, communication interface 218 may include a modem, an Ethernet interface to a LAN, an interface to the Internet, a printer interface, etc. Alternatively, communication interface 218 can include any other type of interface that enables communication between security server 125 and other devices, systems, or networks. Communication interface 218 can be used in lieu of keyboard 214 and cursor control 216 to facilitate operator or machine remote control and communication with security server 125.

As will be described in detail below, security server 125 may perform source path identification and/or prevention measures for a malicious packet that entered autonomous system 120. Security server 125 may perform these functions in response to processor 202 executing sequences of instructions contained in, for example, memory 204. Such instructions may be read into memory 204 from another computer-readable medium, such as storage device 208, or from another device coupled to bus 210 or coupled via communication interface 218.

Alternatively, hardwired circuitry may be used in place of or in combination with software instructions to implement the functions of security server 125. For example, the functionality may be implemented in an application specific integrated circuit (ASIC), a field-programmable gate array (FPGA), or the like, either alone or in combination with other devices.

Returning to FIG. 1, security routers 126-129 may include network devices, such as routers, that may detect and/or prevent the transmission of malicious packets and perform source path identification functions. Security routers 127-129 may include border routers for autonomous system 120 because these routers include connections to public network 150. As a result, security routers 127-129 may include routing tables for routers outside autonomous system 120.

FIG. 3 is an exemplary diagram of packet detection logic 300 according to an implementation consistent with the principles of the invention. Packet detection logic 300 may be implemented within a device that taps one or more bidirectional links of a router, such as security routers 126-129. In another implementation, packet detection logic 300 may be implemented within a router, such as security routers 126-129. In the discussion that follows, it may be assumed that packet detection logic 300 is implemented within a security router.

Packet detection logic 300 may include hash processor 310 and hash memory 320. Hash processor 310 may include a conventional processor, an ASIC, a FPGA, or a combination of these that generates one or more representations of each received packet and records the packet representations in hash memory 320.

A packet representation will likely not be a copy of the entire packet, but rather it will include a portion of the packet or some unique value representative of the packet. Because modern routers can pass gigabits of data per second, storing complete packets is not practical because memories would have to be prohibitively large. By contrast, storing a value representative of the contents of a packet uses memory in a much more efficient manner. By way of example, if incoming packets range in size from 256 bits to 1000 bits, a fixed width number may be computed across fixed-sized blocks making up the content (or payload) of a packet in a manner that allows the entire packet to be identified. To further illustrate the use of representations, a 32-bit hash value, or digest, may be computed across fixed-sized blocks of each packet. Then, the hash value may be stored in hash memory 320 or may be used as an index, or address, into hash memory 320. Using the hash value, or an index derived therefrom, results in efficient use of hash memory 320 while still allowing the content of each packet passing through packet detection logic 300 to be identified.

Systems and methods consistent with the present invention may use any storage scheme that records information about each packet in a space-efficient fashion, that can definitively determine if a packet has not been observed, and that can respond positively (i.e., in a predictable way) when a packet has been observed. Although systems and methods consistent with the present invention can use virtually any technique for deriving representations of packets, for brevity, the remaining discussion will use hash values as exemplary representations of packets having passed through a participating router.

Hash processor 310 may determine a hash value over successive, fixed-sized blocks in the payload field (i.e., the contents) of an observed packet. For example, hash processor 310 may hash each successive 64-byte block following the header field. As described in more detail below, hash processor 310 may use the hash results of the hash operation to recognize duplicate occurrences of packet content and raise a warning if it detects packets with replicated content within a short period of time. Hash processor 310 may also use the hash results for tracing the path of a malicious packet through the network.

The hash value may be determined by taking an input block of data, such as a 64-byte block of a packet, and processing it to obtain a numerical value that represents the given input data. Suitable hash functions are readily known in the art and will not be discussed in detail herein. Examples of hash functions include the Cyclic Redundancy Check (CRC) and Message Digest 5 (MD5).

The resulting hash value, also referred to as a message digest or hash digest, is a fixed length value. The hash value serves as a signature for the data over which it was computed. For example, incoming packets could have fixed hash value(s) computed over their content.

The hash value essentially acts as a fingerprint identifying the input block of data over which it was computed. Unlike fingerprints, however, there is a chance that two very different pieces of data will hash to the same value, resulting in a hash collision. An acceptable hash function should provide a good distribution of values over a variety of data inputs in order to prevent these collisions. Because collisions occur when different input blocks result in the same hash value, an ambiguity may arise when attempting to associate a result with a particular input.

Hash processor 310 may store a representation of each packet it observes in hash memory 320. Hash processor 310 may store the actual hash values as the packet representations or it may use other techniques for minimizing storage requirements associated with retaining hash values and other information associated therewith. A technique for minimizing storage requirements may use a bit array or Bloom filters for storing hash values.

Rather than storing the actual hash value, which can typically be on the order of 32 bits or more in length, hash processor 310 may use the hash value as an index for addressing a bit array within hash memory 320. In other words, when hash processor 310 generates a hash value for a fixed-sized block of a packet, the hash value serves as the address location into the bit array. At the address corresponding to the hash value, one or more bits may be set at the respective location thus indicating that a particular hash value, and hence a particular data packet content, has been seen by hash processor 310. For example, using a 32-bit hash value provides on the order of 4.3 billion possible index values into the bit array. Storing one bit per fixed-sized block rather than storing the block itself, which can be 521 bits long, produces a compression factor of 1:512. While bit arrays are described by way of example, it will be obvious to those skilled in the relevant art, that other storage techniques may be employed with out departing from the spirit of the invention.

Over time, hash memory 320 may fill up and the possibility of overwriting an existing index value increases. The risk of overwriting an index value may be reduced if the bit array is periodically flushed to other storage media, such as a magnetic disk drive, optical media, solid state drive, or the like. Alternatively, the bit array may be slowly and incrementally erased. To facilitate this, a time-table may be established for flushing the bit array. If desired, the flushing cycle can be reduced by computing hash values only for a subset of the packets passing through the router. While this approach reduces the flushing cycle, it increases the possibility that a target packet may be missed (i.e., a hash value is not computed over a portion of it).

Figure 4A:
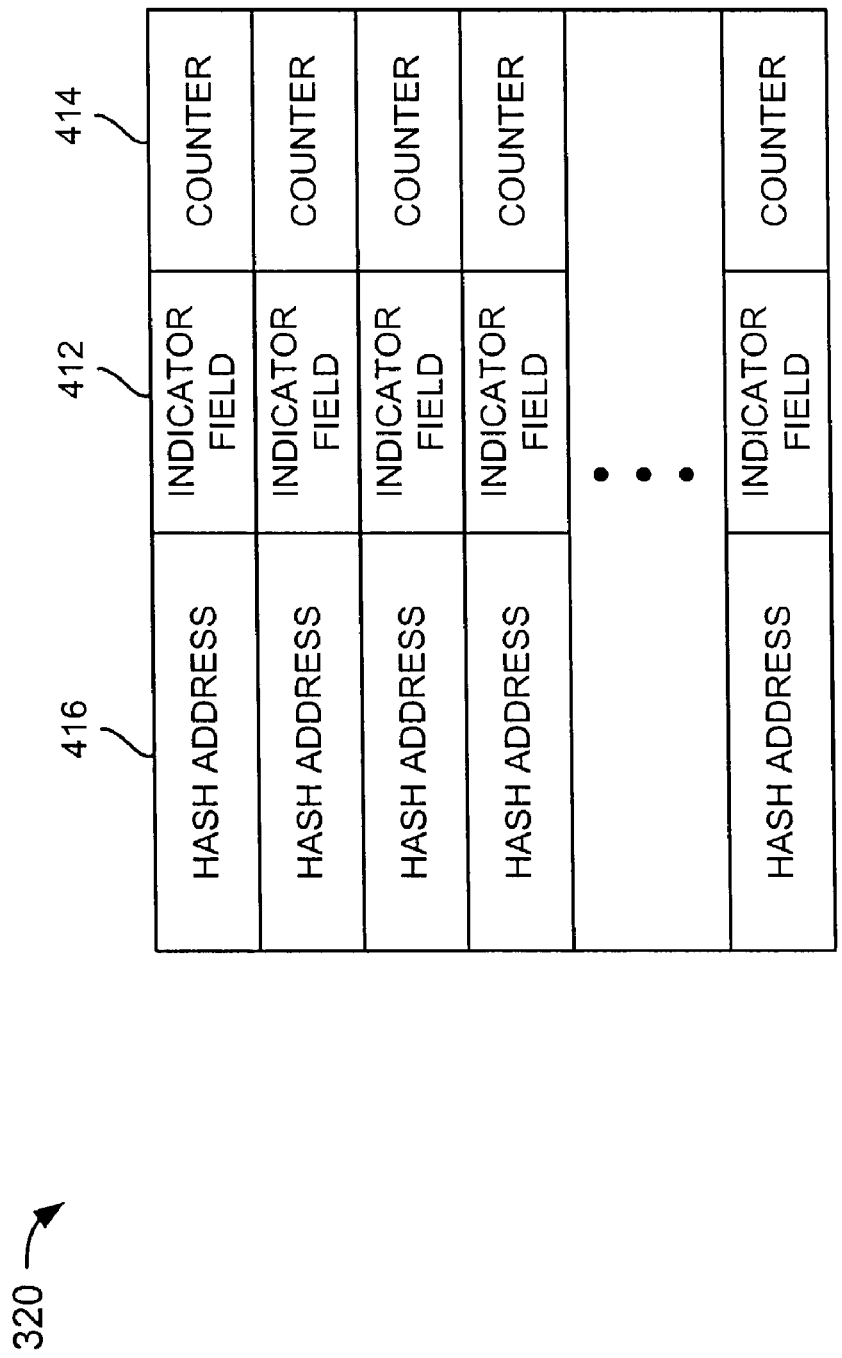
FIGS. 4A and 4B illustrate two possible data structures stored within the hash memory of FIG. 3 in implementations consistent with the principles of the invention.
Figure 4B:
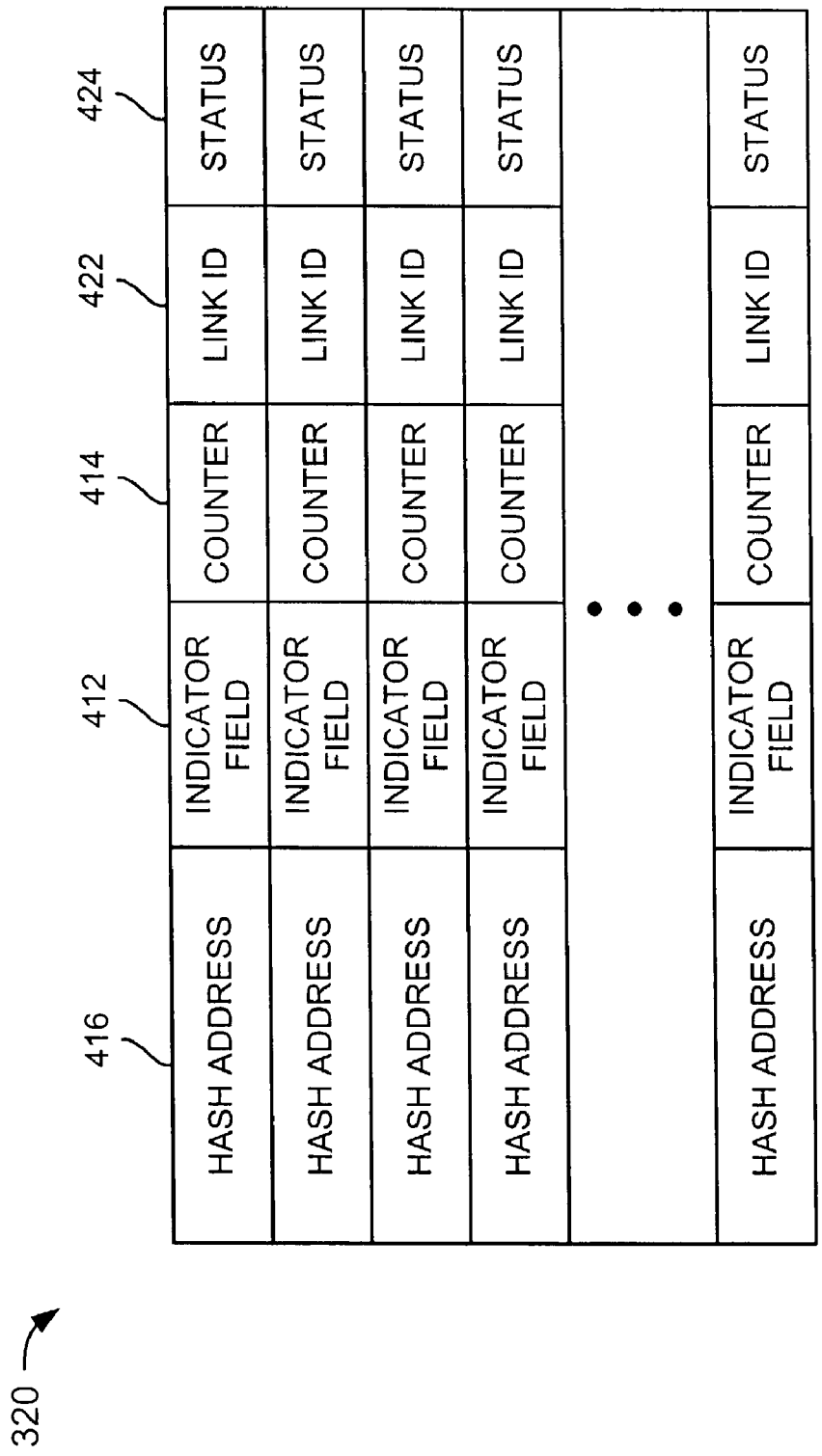

FIGS. 4A and 4B illustrate two possible data structures that may be stored within hash memory 320 in implementations consistent with the principles of the invention. As shown in FIG. 4A, hash memory 320 may include indicator fields 412 and counter fields 414 addressable by corresponding hash addresses 416. Hash addresses 416 may correspond to possible hash values generated by hash processor 310.

Indicator field 412 may store one or more bits that indicate whether a packet block with the corresponding hash value has been observed by hash processor 310. Counter field 412 may record the number of occurrences of packet blocks with the corresponding hash value. Counter field 412 may periodically decrement its count for flushing purposes.

As shown in FIG. 4B, hash memory 320 may store additional information relating to a packet. For example, hash memory 320 may include link identifier (ID) fields 422 and status fields 424. Link ID field 422 may store information regarding the particular link upon which the packet arrived at packet detection logic 300. Status field 424 may store information to aid in monitoring the status of packet detection logic 300 or the link identified by link ID field 422.

In an alternate implementation consistent with the principles of the invention, hash memory 320 may be preprogrammed to store hash values corresponding to known malicious packets, such as known viruses and worms. Hash memory 320 may store these hash values separately from the hash values of observed packets. In this case, hash processor 310 may compare a hash value for a received packet to not only the hash values of previously observed packets, but also to hash values of known malicious packets.

In yet another implementation consistent with the principles of the invention, hash memory 320 may be preprogrammed to store source addresses of known sources of legitimate duplicated content, such as packets from a multicast server, a popular page on a web server, an output from a mailing list "exploder" server, or the like. In this case, hash processor 310 may compare the source address for a received packet to the source addresses of known sources of legitimate duplicated content.

EXEMPLARY PROCESSING FOR MALICIOUS PACKET DETECTION

Figure 5:
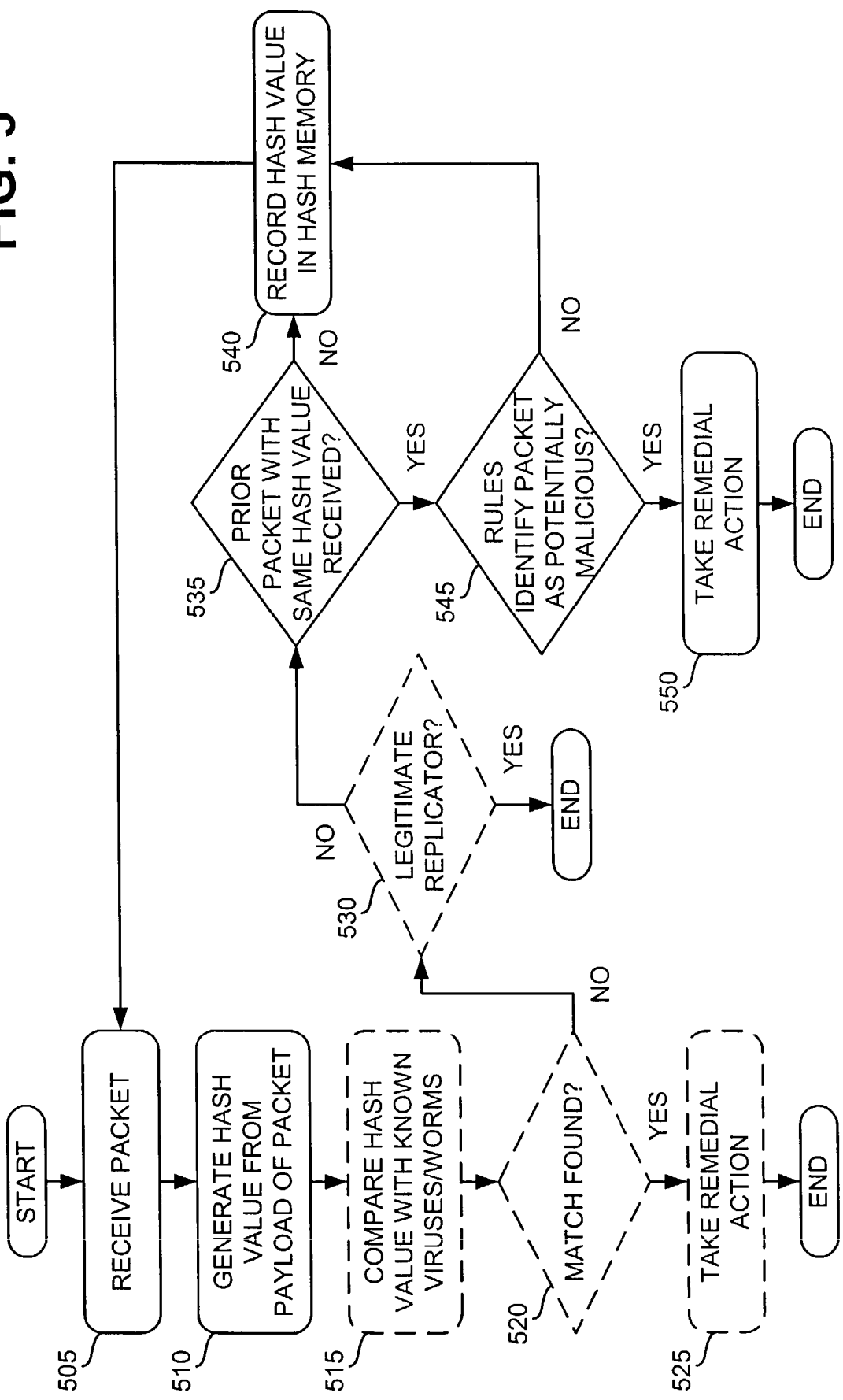
FIG. 5 is a flowchart of exemplary processing for detecting and/or preventing transmission of a malicious packet, such as a virus or worm, according to an implementation consistent with the principles of the invention.

FIG. 5 is a flowchart of exemplary processing for detecting and/or preventing transmission of a malicious packet, such as a virus or worm, according to an implementation consistent with the principles of the invention. The processing of FIG. 5 may be performed by packet detection logic 300 within a tap device, a security router, such as security router 126, or other devices configured to detect and/or prevent transmission of malicious packets. In other implementations, one or more of the described acts may be performed by other systems or devices within system 100.

Processing may begin when packet detection logic 300 receives, or otherwise observes, a packet (act 505). Hash processor 310 may generate one or more hash values by hashing successive, fixed-sized blocks from the packet's payload field (act 510). Hash processor 310 may use a conventional technique to perform the hashing operation.

Hash processor 310 may optionally compare the generated hash value(s) to hash values of known viruses and/or worms within hash memory 320 (act 515). In this case, hash memory 320 may be preprogrammed to store hash values corresponding to known viruses and/or worms. If one or more of the generated hash values match one of the hash values of known viruses and/or worms, hash processor 310 may take remedial actions (acts 520 and 525). The remedial actions may include raising a warning for a human operator, delaying transmission of the packet, requiring human examination before transmission of the packet, dropping the packet and possibly other packets originating from the same Internet Protocol (IP) address as the packet, sending a Transmission Control Protocol (TCP) close message to the sender thereby preventing complete transmission of the packet, disconnecting the link on which the packet was received, and/or corrupting the packet content in a way likely to render any code contained therein inert (and likely to cause the receiver to drop the packet).

If the generated hash value(s) do not match any of the hash values of known viruses and/or worms, or if such a comparison was not performed, hash processor 310 may optionally determine whether the packet's source address indicates that the packet was sent from a legitimate source of duplicated packet content (i.e., a legitimate "replicator") (act530). For example, hash processor 310 may maintain a list of legitimate replicators in hash memory 320 and check the source address of the packet with the addresses of legitimate replicators on the list. If the packet's source address matches the address of one of the legitimate replicators, then hash processor 310 may end processing of the packet. For example, processing may return to act 505 and await receipt of the next packet.

Otherwise, hash processor 310 may determine whether any prior packets with the same hash value(s) have been received (act 535). For example, hash processor 310 may use each of the generated hash value(s) as an address into hash memory 320. Hash processor 310 may then examine indicator field 412 (FIG. 4) at each address to determine whether the one or more bits stored therein indicate that a prior packet has been received.

If there were no prior packets received with the same hash value(s), then hash processor 310 may record the generated hash value(s) in hash memory 320 (act 540). For example, hash processor 310 may set the one or more bits stored in indicator field 412, corresponding to each of the generated hash values, to indicate that the corresponding packet was observed by hash processor 310. Processing may then return to act 505 to await receipt of the next packet.

If hash processor 310 determines that a prior packet has been observed with the same hash value, hash processor 310 may determine whether the packet is potentially malicious (act 545). Hash processor 310 may use a set of rules to determine whether to identify a packet as potentially malicious. For example, the rules might specify that more thanx(wherex>1) packets with the same hash value have to be observed by hash processor 310 before the packets are identified as potentially malicious. The rules might also specify that these packets have to have been observed by hash processor 310 within a specified period of time of one another. The reason for the latter rule is that, in the case of malicious packets, such as viruses and worms, multiple packets will likely pass through packet detection logic 300 within a short period of time.

A packet may contain multiple hash blocks that partially match hash blocks associated with prior packets. For example, a packet that includes multiple hash blocks may have somewhere between one and all of its hashed content blocks match hash blocks associated with prior packets. The rules might specify the number of blocks and/or the number and/or length of sequences of blocks that need to match before hash processor 310 identifies the packet as potentially malicious.

When hash processor 310 determines that the packet is not malicious (e.g., not a worm or virus), such as when less than x number of packets with the same hash value or less than a predetermined number of the packet blocks with the same hash values are observed or when the packets are observed outside the specified period of time, hash processor 310 may record the generated hash value(s) in hash memory 320 (act 540). For example, hash processor 310 may set the one or more bits stored in indicator field 412, corresponding to each of the generated hash values, to indicate that the corresponding packet was observed by hash processor 310. Processing may then return to act 505 to await receipt of the next packet.

When hash processor 310 determines that the packet may be malicious, then hash processor 310 may take remedial actions (act 550). In some cases, it may not be possible to determine whether the packet is actually malicious because there is some probability that there was a false match or a legitimate replication. As a result, hash processor 310 may determine the probability of the packet actually being malicious based on information gathered by hash processor 310.

The remedial actions may include raising a warning for a human operator, saving the packet for human analysis, dropping the packet, corrupting the packet content in a way likely to render any code contained therein inert (and likely to cause the receiver to drop the packet), delaying transmission of the packet, requiring human examination before transmission of the packet, dropping other packets originating from the same IP address as the packet, sending a TCP close message to the sender thereby preventing complete transmission of the packet, and/or disconnecting the link on which the packet was received. Some of the remedial actions, such as dropping or corrupting the packet, may be performed when the probability that the packet is malicious is above some threshold. This may greatly slow the spread rate of a virus or worm without completely stopping legitimate traffic that happened to match a suspect profile.

EXEMPLARY PROCESSING FOR SOURCE PATH IDENTIFICATION

Figure 6:
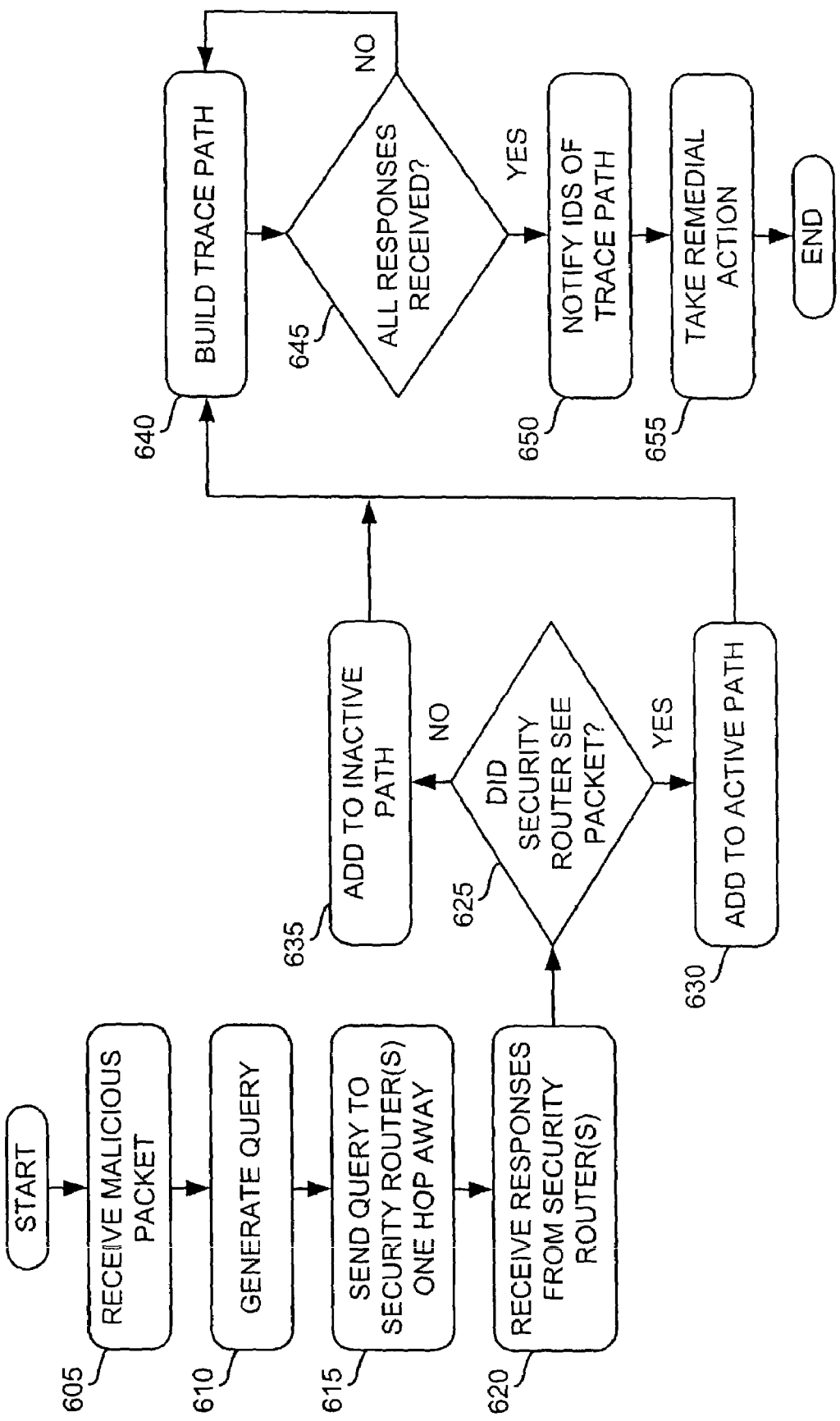
FIG. 6 is a flowchart of exemplary processing for identifying the path taken through a network by a malicious packet, such as a virus or worm, according to an implementation consistent with the principles of the invention.

FIG. 6 is a flowchart of exemplary processing for identifying the path taken through a network by a malicious packet, such as a virus or worm, according to an implementation consistent with the principles of the invention. The processing of FIG. 6 may be performed by a security server, such as security server 125, or other devices configured to trace the paths taken by malicious packets. In other implementations, one or more of the described acts may be performed by other systems or devices within system 100.

Processing may begin with intruder detection system 124 detecting a malicious packet. Intruder detection system 124 may use conventional techniques to detect the malicious packet. For example, intruder detection system 124,may use rule-based algorithms to identify a packet as part of an abnormal network traffic pattern. When a malicious packet is detected, intruder detection system 124 may notify security server 125 that a malicious packet has been detected within autonomous system 120. The notification may include the malicious packet or portions thereof along with other information useful for security server 125 to begin source path identification. Examples of information that intruder detection system 124 may send to security server 125 along with the malicious packet include time-of-arrival information, encapsulation information, link information, and the like.

After receiving the malicious packet, security server 125 may generate a query that includes the malicious packet and any additional information desirable for facilitating communication with participating routers, such as security routers 126-129 (acts 605 and 610). Examples of additional information that may be included in the query are, but are not limited to, destination addresses for participating routers, passwords required for querying a router, encryption keying information, time-to-live (TTL) fields, information for reconfiguring routers, and the like. Security server 125 may then send the query to security router(s) located one hop away (act 615). The security router(s) may analyze the query to determine whether they have seen the malicious packet.

To make this determination, the security router(s) may use processing similar to that described below with regard to FIG. 7.

After processing the query, the security router(s) may send a response to security server. The response may indicate that the security router has seen the malicious packet, or alternatively, that it has not. It is important to observe that the two answers are not equal in their degree of certainty. If a security router does not have a hash matching the malicious packet, the security router has definitively not seen the malicious packet. If the security router has a matching hash, however, then the security router has seen the malicious packet or a packet that has the same hash value as the malicious packet. When two different packets, having different contents, hash to the same value it is referred to as a hash collision.

The security router(s) may also forward the query to other routers or devices to which they are connected. For example, the security router(s) may forward the query to the security router(s) that are located two hops away from security server, which may forward the query to security router(s) located three hops away, and so on. This forwarding may continue to include routers or devices within public network 150 if these routers or devices have been configured to participate in the tracing of the paths taken by malicious packets. This approach may be called an inward-out approach because the query travels a path that extends outward from security server 125. Alternatively, an outward-in approach may be used.

Security server 125 receives the responses from the security routers indicating whether the security routers have seen the malicious packet (acts 620 and 625). If a response indicates that the security router has seen the malicious packet, security server 125 associates the response and identification (ID) information for the respective security router with active path data (act 630). Alternatively, if the response indicates that the security router has not seen the malicious packet, security server 125 associates the response and the ID information for the security router with inactive path data (act 635).

Security server 125 uses the active and inactive path data to build a trace of the potential paths taken by the malicious packet as it traveled, or propagated, across the network (act 640). Security server 125 may continue to build the trace until it receives all the responses from the security routers (acts 640 and 645). Security server 125 may attempt to build a trace with each received response to determine the ingress point for the malicious packet. The ingress point may identify where the malicious packet entered autonomous system 120, public network 150, or another autonomous system.

As security server 125 attempts to build a trace of the path taken by the malicious packet, several paths may emerge as a result of hash collisions occurring in the participating routers. When hash collisions occur, they act as false positives in the sense that security server 125 interprets the collision as an indication that the malicious packet has been observed. Fortunately, the occurrences of hash collisions can be mitigated. One mechanism for reducing hash collisions is to compute large hash values over the packets since the chances of collisions rise as the number of bits comprising the hash value decreases. Another mechanism to reduce false positives resulting from collisions is for each security router (e.g., security routers 126-129) to implement its own unique hash function. In this case, the same collision will not occur in other security routers.

A further mechanism for reducing collisions is to control the density of the hash tables in the memories of participating routers. That is, rather than computing a single hash value and setting a single bit for an observed packet, a plurality of hash values may be computed for each observed packet using several unique hash functions. This produces a corresponding number of unique hash values for each observed packet. While this approach fills the hash table at a faster rate, the reduction in the number of hash collisions makes the tradeoff worthwhile in many instances. For example, Bloom Filters may be used to compute multiple hash values over a given packet in order to reduce the number of collisions and, hence, enhance the accuracy of traced paths.

When security server 125 has determined an ingress point for the malicious packet, it may notify intruder detection system 124 that the ingress point for the malicious packet has been determined (act 650). Security server 125 may also take remedial actions (act 655). Often it will be desirable to have the participating router closest to the ingress point close off the ingress path used by the malicious packet. As such, security server 125 may send a message to the respective participating router instructing it to close off the ingress path using known techniques.

Security server 125 may also archive copies of solutions generated, data sent, data received, and the like either locally or remotely. Furthermore, security server 125 may communicate information about source path identification attempts to devices at remote locations coupled to a network. For example, security server 125 may communicate information to a network operations center, a redundant security server, or to a data analysis facility for post processing.

EXEMPLARY PROCESSING FOR DETERMINING WHETHER A MALICIOUS PACKET HAS BEEN OBSERVED

FIG. 7 is a flowchart of exemplary processing for determining whether a malicious packet, such as a virus or worm, has been observed according to an implementation consistent with the principles of the invention. The processing of FIG. 7 may be performed by packet detection logic 300 implemented within a security router, such as security router 126, or by other devices configured to trace the paths taken by malicious packets. In other implementations, one or more of the described acts may be performed by other systems or devices within system 100.

Processing may begin when security router 126 receives a query from security server 125 (act 705). As described above, the query may include a TTL field. A TTL field may be employed because it provides an efficient mechanism for ensuring that a security router responds only to relevant, or timely, queries. In addition, employing TTL fields may reduce the amount of data traversing the network between security server 125 and participating routers because queries with expired TTL fields may be discarded.

If the query includes a TTL field, security router 126 may determine if the TTL field in the query has expired (act 710). If the TTL field has expired, security router 126 may discard the query (act 715). If the TTL field has not expired, security router 126 may hash the malicious packet contained within the query at each possible starting offset within a block (act 720). Security router 126 may generate multiple hash values because the code body of a virus or worm may appear at any arbitrary offset within the packet that carries it (e.g., each copy may have an e-mail header attached that differs in length for each copy).

Security router 126 may then determine whether any of the generated hash values match one of the recorded hash values in hash memory 320 (act 725). Security router 126 may use each of the generated hash values as an address into hash memory 320. At each of the addresses, security router 126 may determine whether indicator field 412 indicates that a prior packet with the same hash value has been observed. If none of the generated hash values match a hash value in hash memory 320, security router 126 does not forward the query (act 730), but instead may send a negative response to security server 125 (act 735).

If one or more of the generated hash values match a hash value in hash memory 320, however, security router 126 may forward the query to all of its output ports excluding the output port in the direction from which the query was received (act 740). Security router 126 may also send a positive response to security server 125, indicating that the packet has been observed (act 745). The response may include the address of security router 126 and information about observed packets that have passed through security router 126.

CONCLUSION

Systems and methods consistent with the present invention provide mechanisms to detect and/or prevent transmission of malicious packets, such as viruses and worms, and trace the propagation of the malicious packets through a network.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, systems and methods have been described with regard to network-level devices. In other implementations, the systems and methods described herein may be used with a stand-alone device at the input or output of a network link or at other protocol levels, such as in mail relay hosts (e.g., Simple Mail Transfer Protocol (SMTP) servers).

While series of acts have been described with regard to the flowcharts of FIGS. 5-7, the order of the acts may differ in other implementations consistent with the principles of the invention. In addition, non-dependent acts may be performed concurrently.

Further, certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for detecting transmission of malicious packets, comprising:
   receiving a packet;
   generating a plurality of hash values from a payload field in the packet;
   comparing the generated hash values to hash values corresponding to prior packets; and
   determining that the packet is a potentially malicious packet when a plurality of the generated hash to the packet matches a plurality of the hash values corresponding to one of the prior packets and the one prior packet was received within a predetermined amount of time of the packet.

2. The method of claim 1, wherein the generating the hash values from the payload field includes:
   hashing successive fixed-sized blocks in the payload field in the packet.

3. The method of claim 1, further comprising:
   storing a plurality of hash values corresponding to known malicious packets.

4. The method of claim 3, further comprising:
   comparing the generated hash values to the hash values corresponding to the known malicious packets; and
   declaring that the packet is a malicious packet when one or more of the generated hash values corresponding to the packet matches one or more of the hash values corresponding to the known malicious packets.

5. The method of claim 4, further comprising:
   taking remedial action when the packet is declared a malicious packet.

6. The method of claim 5, wherein the taking remedial action includes at least one of:
   raising a warning,
   delaying transmission of the packet,
   requiring human examination of the packet,
   dropping the packet,
   dropping other packets originating from a same address as the packet,
   sending a Transmission Control Protocol (TCP) close message to a sender of the packet, disconnecting a link on which the packet was received, or corrupting the packet.

7. The method of claim 1, further comprising:
   determining whether more than a predefined number of the prior packets with the matching plurality of hash values was received.

8. The method of claim 7, wherein the determining that the packet is a potentially malicious packet includes:
   identifying the packet as a potentially malicious packet when more than the predefined number of the prior packets were received within the predetermined amount of time of the packet.

9. The method of claim 7, further comprising:
   recording the generated hash values corresponding to the packet when no more than the predefined number of the prior packets was received.

10. The method of claim 1, wherein the potentially malicious packet is associated with one of a virus or a worm.

11. The method of claim 1, further comprising:
   taking remedial action when the packet is determined to be a potentially malicious packet.

12. The method of claim 11, wherein the taking remedial action includes at least one of:
   raising a warning,
   delaying transmission of the packet,
   requiring human examination of the packet,
   dropping the packet,
   dropping other packets originating from a same address as the packet,
   sending a Transmission Control Protocol (TCP) close message to a sender of the packet,
   disconnecting a link on which the packet was received, or corrupting the packet.

13. The method of claim 11, wherein the taking remedial action includes:
    determining a probability value associated with whether the packet is a potentially malicious packet, and
    performing a remedial action when the probability value is above a threshold.

14. The method of claim 1, further comprising:
    comparing a source address associated with the packet to addresses of legitimate replicators, and
    determining that the packet is not malicious when the source address matches one of the addresses of legitimate replicators.

15. A system for hampering transmission of a potentially malicious packet, comprising:
    means for receiving a packet;
    means for generating a plurality of hash values from a payload field in the packet;
    means for comparing the generated hash values to hash values corresponding to prior packets;
    means for determining that the packet is a potentially malicious packet when a plurality of the generated hash values match a plurality of the hash values corresponding to at least one of the prior packets and the at least one of the prior packets was received within a predetermined amount of time of the packet; and
    means for hampering transmission of the packet when the packet is determined to be a potentially malicious packet.

16. A system for detecting transmission of potentially malicious packets, comprising:
    a plurality of input ports configured to receive a plurality of packets;
    a plurality of output ports configured to transmit the packets;
    a hash processor configured to:
        observe one of the packets received at the input ports,
        generate a plurality of hash values from a payload field in the one packet,
        compare the generated hash values to hash values corresponding to previous packets, and
        determine that the one packet is a potentially malicious packet when a plurality of the generated hash values corresponding to the one packet matches a plurality of the hash values corresponding to one of the previous packets and the one previous packet was received within a predetermined amount of time of the one packet.

17. The system of claim 16, wherein when generating the hash values from the payload field, the hash processor is configured to hash successive fixed-sized blocks in the payload field in the one packet.

18. The system of claim 16, further comprising:
    a hash memory configured to store a plurality of hash values corresponding to known malicious packets.

19. The system of claim 18, wherein the hash processor is further configured to:
    compare one or more of the generated hash values to the hash values in the hash memory, and
    declare that the one packet is a malicious packet when the one or more of the generated hash values corresponding to the one packet matches one or more of the hash values in the hash memory.

20. The system of claim 19, wherein the hash processor is further configured to take remedial action when the one packet is declared a malicious packet.

21. The system of claim 20, wherein when taking remedial action, the hash processor is configured to at least one of:
    raise a warning,
    delay transmission of the one packet,
    require human examination of the one packet,
    drop the one packet,
    drop other packets originating from a same address as the one packet,
    send a Transmission Control Protocol (TCP) close message to a sender of the one packet,
    disconnect a link on which the one packet was received, or corrupt the one packet.

22. The system of claim 16, wherein the hash processor is further configured to determine whether more than a predefined number of the previous packets with the plurality of hash values was received.

23. The system of claim 22, wherein when determining that the one packet is a potentially malicious packet, the hash processor is configured to identify the one packet as a potentially malicious packet when more than the predefined number of the previous packets were received within the predetermined amount of time of the one packet.

24. The system of claim 22, wherein the hash processor is further configured to record the generated hash values corresponding to the one packet when no more than the predefined number of the previous packets was received.

25. The system of claim 16, wherein the potentially malicious packet is associated with one of a virus or a worm.

26. The system of claim 16, wherein the hash processor is further configured to take remedial action when the one packet is determined to be a potentially malicious packet.

27. The system of claim 26, wherein when taking remedial action, the hash processor is configured to at least one of:
    raise a warning,
    delay transmission of the one packet,
    require human examination of the one packet,
    drop the one packet,
    drop other packets originating from a same address as the one packet,
    send a Transmission Control Protocol (TCP) close message to a sender of the one packet,
    disconnect a link on which the one packet was received, or corrupt the one packet.

28. The system of claim 26, wherein when taking remedial action, the hash processor is configured to:
    determine a probability value associated with whether the one packet is a potentially malicious packet, and
    perform a remedial action when the probability value is above a threshold.

29. The system of claim 16, wherein the hash processor is further configured to:
    compare a source address associated with the one packet to addresses of legitimate replicators, and
    determine that the one packet is not malicious when the source address matches one of the addresses of legitimate replicators.

* * * * *

UNITED STATES PATENT AND TRADEMARK OFFICE
CERTIFICATE OF CORRECTION

PATENT NO.       : 7,328,349 B2
APPLICATION NO.  : 10/251403
DATED            : February 5, 2008
INVENTOR(S)      : Walter C. Milliken It is certified that error appears in the above-identified patent and that said Letters Patent is hereby corrected as shown below:

Claim 1, Column 14, line 2, change "generated hash" to -- generated hash values corresponding --

Claim 16, Column 15, line 37, change "pavload" to -- payload --

Signed and Sealed this

Thirteenth Day of May, 2008

JON W. DUDAS
*Director of the United States Patent and Trademark Office*